Patented Oct. 17, 1944

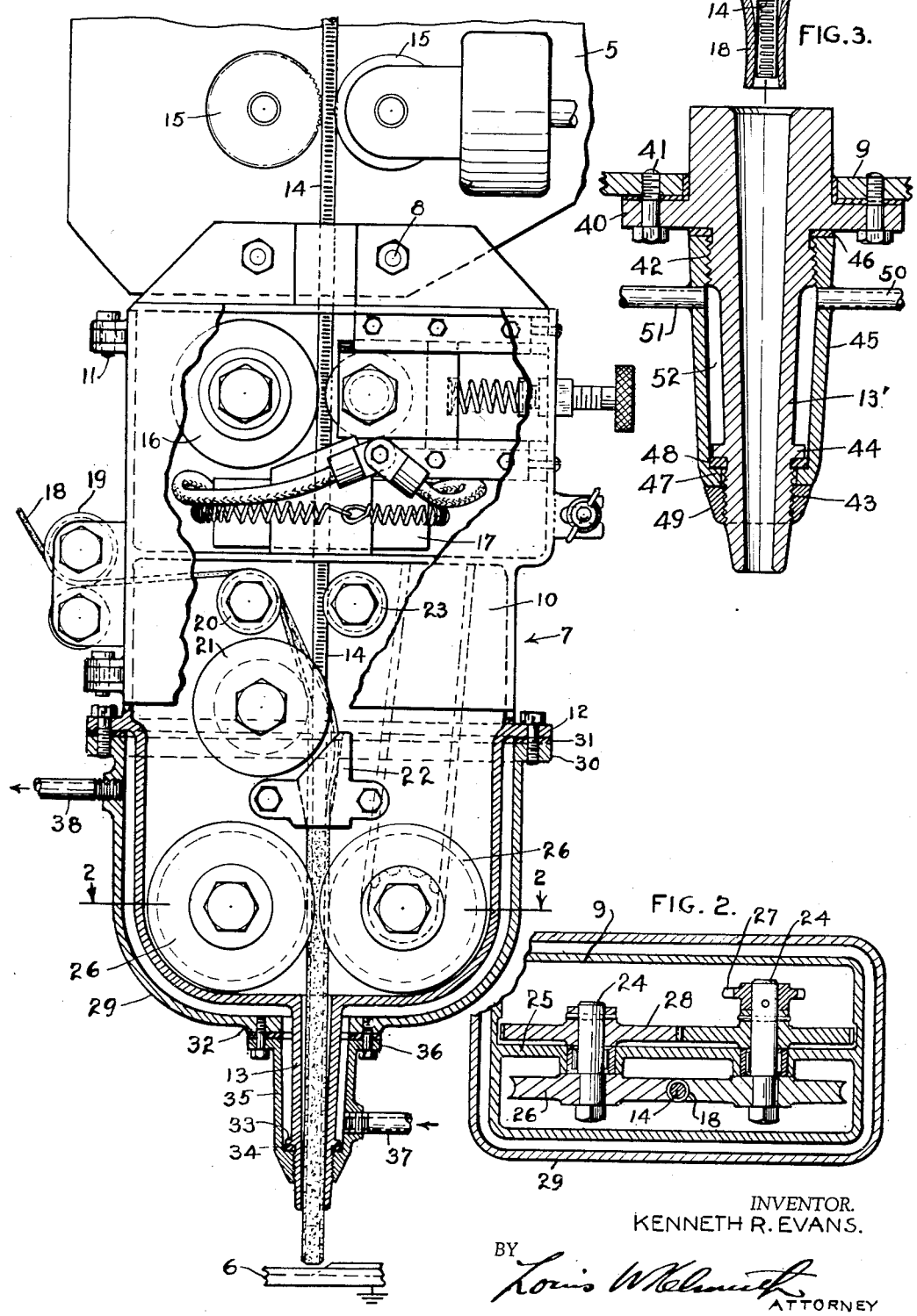

2,360,409

UNITED STATES PATENT OFFICE 2,360,409

AUTOMATIC ARC WELDING HEAD

Kenneth R. Evans, Lakewood Ohio, assignor to The Midland Steel Products Company, Cleveland, Ohio, a corporation of Ohio Application June 29, 1942, Serial No. 448,887

8 Claims. (Cl. 314—21)

This invention relates to new and useful improvements in automatic arc welding heads of the type in which a flux-slag carrying tape is automatically wrapped about the welding wire as it is being fed to the welding zone. Such heads are of necessity in close proximity to the intense heat of the welding, which has been found to cause the tape to soften and become more pliable so that it galls the rolls, guides and nozzle and at times folds upon itself and runs out of its intended path, thereby choking the head.

An important object of the invention is to provide an improved construction for the nozzle and head to prevent this faulty operation and to make it possible to pull instead of push the tape through the head.

Another object of the invention is to provide a nozzle and head construction which dissipates the heat of welding and maintains the essential parts of the head in cool operative condition.

Other objects and advantages of the invention will become apparent during the course of the following description.

In the accompanying drawing forming a part of the application and wherein like numerals are employed to designate like parts throughout the several views, Fig. 1 is a fragmentary side elevation of the welding head, with parts thereof shown in section to clarify the construction.

Fig. 2 is a transverse section of the same on the line 2—2 of Fig. 1,

Fig. 3 is an enlarged longitudinal section of an improved form of welding nozzle.

Referring now more particularly to the drawing, the numeral 5 designates a support above the work 6 to be welded and which suspends an automatic arc welding head 7 by means of bolts 8 or other suitable fastening means. This welding head is composed of an elongated rectangular housing 9, one side of the upper portion of which has a door 10 hinged thereto on the hinges 11 so that it can be swung open to give access to the interior mechanism of the welding head. About halfway of its height, the casing is provided with an outwardly extending continuous flange 12. The bottom of the casing is provided with a depending nozzle 13 having a slightly tapered longitudinal bore therethrough whereby the tape may be more firmly gradually clinched around the weld wire 14.

In apparatus now on the market, the weld wire from a reel supported overhead is fed into the top of the welding head by means of a pair of driven feed rolls 15 which may be mounted upon the support 5 or the top of the welding head. As the weld wire moves down into the welding head it is first passed between a pair of straightening rolls 16, one of which is journaled in the casing and the other of which is adjustably and yieldingly urged into contact with the weld wire by a suitable spring mechanism. Below these rolls is a pair of current conducting brushes 17 resiliently held in contact with opposite sides of the weld wire as it passes down through the welding head. At this point a flux carrying tape 18 such as shown in the prior patent to Bereit, No. 2,164,104, is fed into the casing of the welding head from a suitable reel and between a pair of smoothing rolls 19 from where the tape enters the side of the casing and passes over a cylindrical roller 20 into contact with the grooved surface of a roller 21, both of which are carried by the casing 8. This roll 21 forms the tape into somewhat trough shape section around one side of the welding wire 14, which is guided into the trough of the tape by a grooved guide roll 23. From this point, the wire and tape are conjointly pushed through a conical forming shoe 22 which causes the tape to close further around the welding wire so that the two longitudinal edges of the tape almost meet each other to completely enclose the wire.

Beneath the conical forming throat 22 and journaled in the sides of the casing 9 or an intermediate vertical partition 25 therein, I provide a pair of shafts 24, each having a grooved roll 26 keyed thereon and adapted to engage opposite sides of the taped weld wire to completely confine the tape 18 in the complementary grooves and deform it into intimate substantially completely surrounding engagement with the welding wire. One of these shafts 24 is provided with a driving sprocket or gear 27 which may be arranged exteriorly or interiorly of the welding head to be driven from any suitable source. Both shafts 24 are provided with meshing gears 28 so that both grooved rollers 26 are positively driven to grip and pull the tape through the welding head along with the wire and feed it through the nozzle 13 toward the work to strike an arc therewith as the tape and wire are progressively consumed in the welding operation. Thus it will be apparent that the tape is gripped between the weldrod and driven rolls and is actually pulled downwardly. The weldrod is also gripped between the tape and rolls 26 so that it is being both pushed from above and pulled downwardly from below. Were the tape only pushed from the casing as in previous apparatus without the pulling action thereon exercised by the rolls 26, this tape would buckle excessively between the throat 22 and the nozzle 13.

This last pair of grooved rolls 26 may now be journaled directly in the casing of the welding head without fear of the intense heat from the welding operation having detrimental effects upon their bearings, since the lower portion of the welding head is surrounded with a water jacket 29 having an outwardly extending continuous flange 30 surrounding the same so that it can be bolted to the flange 12 with a sealing gasket 31 therebetween to form a water tight connection with the casing. This water jacket 29 is spaced from all portions of the bottom of the casing 9 and its bottom is provided with a flanged opening 32 for the passage of the nozzle 13. The lower portion of the nozzle is externally threaded and provided with a shoulder 33 against which a gasket 34 is clamped by the shouldered lower end of a nozzle jacket 35 which is arranged in spaced relationship to the body of the nozzle 13 and terminates in an outwardly extending flange 36 to be bolted or otherwise suitably secured to the collar 32. The lower end of this nozzle jacket 35 is provided with an inlet 37 for a coolant or refrigerant which circulates about the nozzle 13 and lower end of the welding head casing 9 to exhaust through a conduit 38 tapped into the upper portion of the water jacket 29.

Thus, the nozzle 13 is maintained in a cool state so that it will not become galled by the tape passing therethrough to interfere with the successful operation of the welding head. Also, the entire bottom of the welding head casing 9 is kept in a cool state so that wire propelling rolls 26 can be journaled in the casing and will not become damaged or frozen from the heat of welding. As a result the tape is pulled as the wire is pushed downwardly through the welding head and fed through the nozzle which is a distinct advantage over equipment now being manufactured in which both the weld wire and tape are pushed downwardly through the head thereby causing the tape 18 to occasionally crimp and be folded between the roll 21 and conical guide 22 thereby choking the feed of the weld wire. By engaging the tape sheath where it is formed completely around the wire, the rolls 26 will serve to grip and feed the tape sheath along with the wire with a pulling action through the forming throat 22, thereby overcoming faults with present equipment. In such equipment unprotected from the heat of welding, the bottom of the welding head casing became so hot that driven rolls 26 could not be journaled and effectively maintained for any length of service. As a result, present day welding equipment of this type provides a pair of immovable shoes in place of the rolls 26, which adds frictional resistance to the free passage of the tape and causes faulty operation of equipment now being sold.

In the event that it is only necessary to cool the welding nozzle 13 and dispense with the water jacket 29, reference is made to Fig. 3 wherein the welding nozzle 13' is provided near its upper end with a continuous outstanding flange 40 which is bolted directly to the bottom of the welding head casing 9 by means of the bolts 41. The nozzle 13' is provided with external threads 42 adjacent the flange or collar 40 and a second set of identical threads 43 is provided near the lower end of the nozzle and below the flange 44. In order to water cool this nozzle, a hollow tubular water jacket 45 arranged in spaced relation to the major portion of the length of the nozzle is provided with an internally threaded upper end to screw upon the threads 42 and against a gasket 46. The lower end of the jacket is tapered inwardly and is provided with a shoulder 47 which compresses a gasket 48 in gas and water tight engagement with the collar 44 as the jacket is screwed upon the threads 42. A nut 49 may be screwed upon the threads 43 against the lower end of the jacket, or this nut may be formed as an integral part of the lower end of the jacket with threads corresponding exactly to the threads 42 in order that the jacket may be screwed upon both threaded portions 42 and 43 at the same time. Inlet and outlet conduits 50 and 51 are provided to transmit a cooling medium in the form of liquid or a refrigerant gas to and from the chamber 52 surrounding the major portion of the welding nozzle. As a modification, the nozzle and lower portion of the welding head casing 9 may be provided with a series of heat radiating fins disposed either horizontally, vertically or otherwise to dissipate the heat from the welding operation away from the nozzle and casing. In Fig. 1 it will be noted that the threads at the lower end of nozzle 13 may be dispensed with when the nozzle jacket 35 is secured to the jacket 29, since the shoulder of the nozzle gasket can be employed to compress the gasket 34 against the collar 33 of the welding nozzle as the bolts securing the flanges 12 and 30 are tightened to also simultaneously compress the gasket 31 thereby forming leakproof joints at both the top and bottom of the unitary jacket. Likewise, the nut 49 shown in Fig. 3 may be dispensed with so that the flange 47 will act to compress the gasket 48 as the nozzle jacket 45 is screwed upon the threads 42 to compress the gasket 46.

It will be understood that various changes in the size, shape and relation of parts may be resorted to without departing from the spirit of the invention or the scope of the appended claims.

I claim:

1. An arc welding casing having means for guiding welding wire therethrough, a cooling jacket spaced from the casing and being substantially co-extensive with the bottom thereof, and means for supplying a coolant to the space between the casing and jacket.

2. The combination with an arc welding casing for feeding weld wire having rotary gripping and pulling means mounted on axes at the end of the casing near the point of welding for engaging opposite sides of weld wire therebetween and pulling the same toward said point, and means for dissipating heat from said axes for protecting same from the heat of welding.

3. The combination with an arc welding casing having means at the end thereof near the point of welding for gripping and pulling weld wire through the casing toward said point, and a coolant jacket surrounding said end of the casing through which a coolant is circulated to protect the gripping and pulling means from the heat of welding.

4. The combination with an arc welding casing for feeding weld wire, a pair of driven gripping and pulling rolls journaled in the lower end of the casing near the point of welding for gripping opposite sides of the weld wire therebetween and pulling the same toward said point, and means for cooling said rolls and their axes for protecting them from the heat of welding.

5. The combination with an arc welding casing, means associated with the lower end of the casing nearest the point of welding for guiding weld wire toward said point, and a jacket surrounding the lower end of the casing and spaced therefrom to define a coolant space through which a cooling medium is passed to protect the guide means from the heat of welding.

6. The combination with an arc welding casing having means therein for feeding weld wire through a guide nozzle depending from the casing and through which the wire is automatically fed to arcing relation with the work, and a jacket surrounding the lower end of said casing and nozzle and uniformly spaced from the casing and nozzle to define a coolant chamber through which a cooling medium is passed to protect the nozzle and said means from the heat of welding.

7. An arc welding head comprising a casing, a guide nozzle associated therewith and having two sets of threads adjacent the upper and lower ends thereof and an integral collar just above the lower set, a gasket associated with said collar, a jacket surrounding the exposed portion of the nozzle and spaced therefrom to form a coolant chamber, and said jacket having means at its ends provided with threads to engage those of the nozzle and to force said gasket into leakproof relation with said collar.

8. The combination with an arc welding casing having a depending guide nozzle with a collar, said casing having an outstanding continuous flange, a jacket surrounding the casing below said flange and having a depending nozzle portion spaced from the casing and nozzle to define a coolant space, and said jacket having a flange secured to the casing flange to draw the nozzle portion of the casing into leakproof engagement with the collar of the guide nozzle.

KENNETH R. EVANS.